(12) United States Patent
Davis et al.

(10) Patent No.: US 10,747,279 B2
(45) Date of Patent: Aug. 18, 2020

(54) MANAGING NOISE LEVELS OF ACTIVE COOLING DEVICES

(71) Applicant: MOTOROLA MOBILITY LLC, Chicago, IL (US)

(72) Inventors: Giles Davis, Downers Grove, IL (US); Martin R. Pais, North Barrington, IL (US)

(73) Assignee: Motorola Mobility LLC, Chicago, IL (US)

( * ) Notice: Subject to any disclaimer, the term of this patent is extended or adjusted under 35 U.S.C. 154(b) by 98 days.

(21) Appl. No.: 15/946,027

(22) Filed: Apr. 5, 2018

(65) Prior Publication Data

US 2019/0310694 A1    Oct. 10, 2019

(51) Int. Cl.
| | |
|---|---|
| *G05D 23/00* | (2006.01) |
| *G06F 1/20* | (2006.01) |
| *G01K 13/00* | (2006.01) |
| *H04R 29/00* | (2006.01) |

(52) U.S. Cl.
CPC ............. *G06F 1/206* (2013.01); *G01K 13/00* (2013.01); *H04R 29/00* (2013.01)

(58) Field of Classification Search
CPC ................................ G01K 13/00; H04R 29/00
USPC ......................................................... 700/300
See application file for complete search history.

(56) References Cited

U.S. PATENT DOCUMENTS

| | | | | |
|---|---|---|---|---|
| 6,494,381 | B2* | 12/2002 | Bulthuis | G06F 1/206 181/141 |
| 7,392,066 | B2* | 6/2008 | Haparnas | H04M 19/044 379/373.01 |
| 7,941,231 | B1* | 5/2011 | Dunn | G06F 1/203 361/695 |
| 2009/0281642 | A1* | 11/2009 | Ady | G11B 33/142 700/94 |
| 2012/0327581 | A1* | 12/2012 | Pais | G06F 1/1632 361/679.26 |
| 2017/0045261 | A1* | 2/2017 | Kim | F25B 49/022 |
| 2017/0219240 | A1* | 8/2017 | Cassini | G06F 1/206 |
| 2019/0008074 | A1* | 1/2019 | Chen | F04D 27/004 |

* cited by examiner

*Primary Examiner* — Md Azad
(74) *Attorney, Agent, or Firm* — Yudell Isidore PLLC (57) ABSTRACT

A method, a system, and a computer program product for managing noise generated by active cooling devices of an electronic device. The method includes determining a current noise level of at least one active cooling device of an electronic device. The method further includes measuring, by at least one microphone of the electronic device, a level of ambient noise within a surrounding environment. The method further includes measuring, via at least one thermal sensor, a heat load generated by at least one heat generating device of the electronic device. The method further includes applying, to the at least one active cooling device, at least one adjustment that mitigates the heat load and minimizes noise generated by the at least one active cooling device relative to the level of ambient noise.

20 Claims, 7 Drawing Sheets

System Memory 110

Characteristics 210

Table 302

| Voltage (V) | Fan Speed (RPM) | Noise (dB) | Peak Noise (kHz) |
|---|---|---|---|
| 1 | 400 | 25 | 0.25 |
| 1.2 | 500 | 28 | 0.26 |
| 1.4 | 600 | 31 | 0.27 |
| ... | ... | ... | ... |
| 5 | 2000 | 61 | 2.2 |

Algorithm 304

MANAGING NOISE LEVELS OF ACTIVE COOLING DEVICES

BACKGROUND

1. Technical Field

The present disclosure generally relates to electronic devices and in particular to a method for managing noise generated by active cooling devices.

2. Description of the Related Art

Some modern electronic devices, such as notebook computers and gaming devices, are equipped with active cooling devices. As the hardware and software capabilities of electronic devices increases, the amount of power required to drive and support these enhanced capabilities also increases, resulting in additional heat generation. In modern electronic devices, when the temperature of a passively cooled electronic device exceeds a threshold level, the electronic device self regulates the internal power dissipation by applying present algorithms which mitigate operating characteristics of hardware of the device, such as reducing a maximum clock speed of a processor. By mitigating operating characteristics of hardware, the quality of the performance and the user experience delivered by the electronic device is reduced.

Some electronic devices incorporate active cooling devices, such as fans and/or blowers, which augment air flow within the electronic device to enhance heat dissipation without throttling hardware of the device. However, the moving components in those modern active cooling devices generate audible noise which can also reduce the quality of the user experience.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, a system, and a computer program product for managing noise generated by active cooling devices of an electronic device. The method includes determining a current noise level of at least one active cooling device of an electronic device. The method further includes measuring, by at least one microphone of the electronic device, a level of ambient noise within a surrounding environment. The method further includes measuring, via at least one thermal sensor, a heat load generated by at least one heat generating device of the electronic device. The method further includes applying, to the at least one active cooling device, at least one adjustment that mitigates the heat load and minimizes noise generated by the at least one active cooling device relative to the level of ambient noise and/or a level of noise associated with a current playback session of media.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within the below described electronic device 100 (FIG. 1) are not intended to be exhaustive, but rather are representative to highlight components that can be utilized to implement the present disclosure. Other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Figure 1:
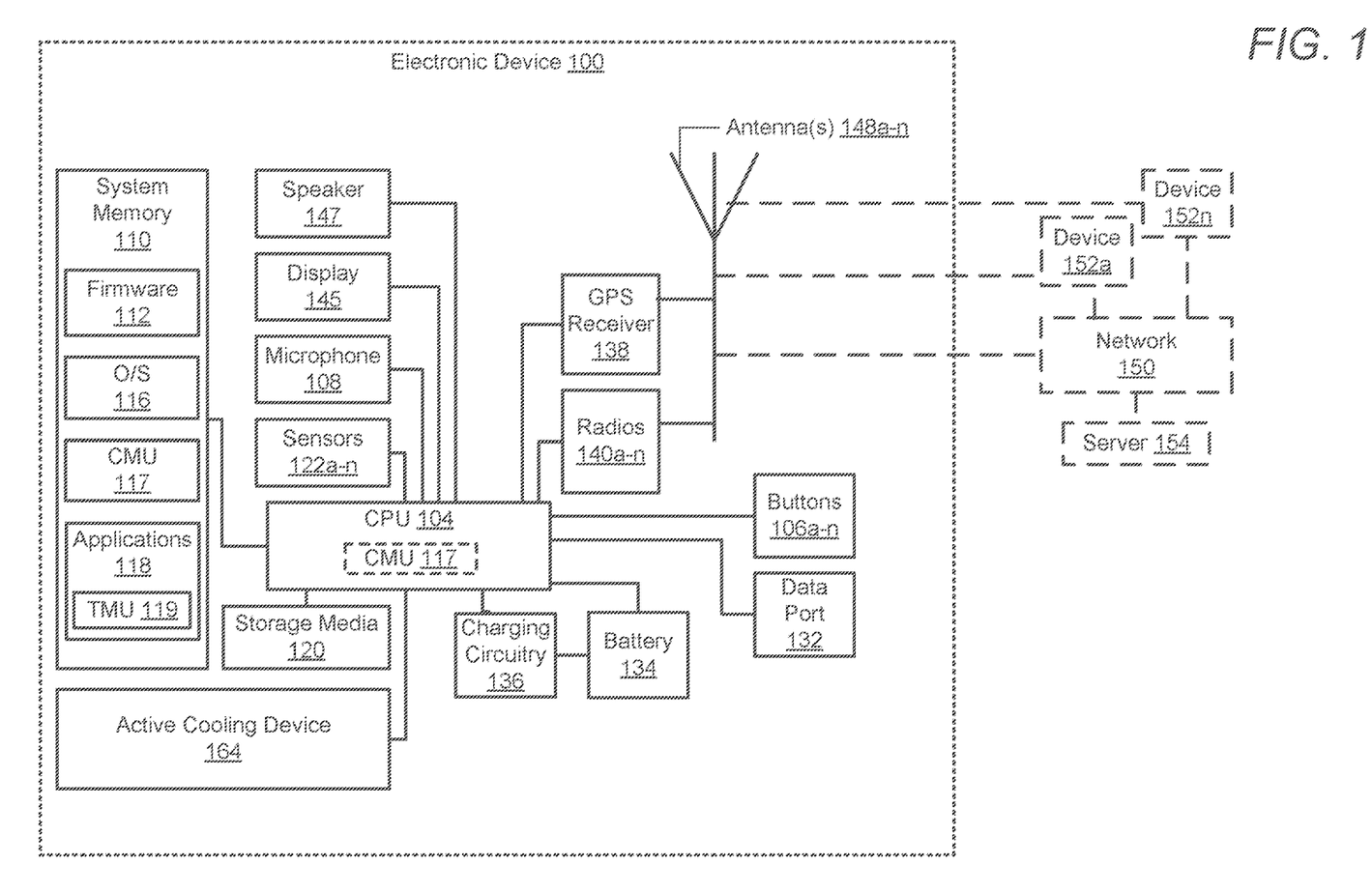
FIG. 1 illustrates an example electronic device within which certain aspects of the disclosure can be practiced, in accordance with one or more embodiments.

Now turning to FIG. 1, there is illustrated an example electronic device 100 within which one or more of the described features of the various embodiments of the disclosure can be implemented. In one embodiment, electronic device 100 can be any electronic device that is equipped with at least one active cooling device. For example, electronic device 100 can include, but is not limited to, virtual reality headsets, entertainment devices, gaming devices, a desktop computer, a monitor, a notebook computer, a mobile/cellular phone, a mobile/cellular phone accessory, a digital camera, a video recorder, or a tablet computer. Electronic device 100 includes central processing unit (CPU) 104. CPU 104 may contain a plurality of cores, each of which is capable of independent processing. In another embodiment, CPU 104 includes multiple CPUs. In another embodiment, CPU 104 may include a graphical processing unit (GPU), general purpose graphical processing unit (GPGPU), and/or digital signal processor (DSP). CPU 104 is coupled to storage media 120 and system memory 110, within which firmware 112, operating system (OS) 116, cooling management utility (CMU) 117, and applications 118 can be stored for execution by CPU 104. According to one aspect, CMU 117 executes within electronic device 100 to perform the various methods and functions described herein. In one or more embodiments, CMU 117 manages and/or dynamically applies adjustments to active cooling device 164 and/or input/output components of electronic device 100 to mitigate a heat load generated by components (e.g., CPU 104) of electronic device 100 and minimize audible noise generated by active cooling device 164. For example, CMU 117 may increase or decrease a fan speed associated with active cooling device 164 based on one or both of thermal conditions associated with electronic device 100 and/or an environment of electronic device 100. In another example, CMU 117 may also increase or decrease a fan speed associated with active cooling device 164 based on current media playback sessions and/or software applications 118 executing on electronic device 100. For simplicity, CMU 117 is illustrated and described as a stand-alone or separate software/firmware/logic component, which provides the specific functions and methods described below. However, in at least one embodiment, CMU 117 may be a component of, may be combined with, or may be incorporated within firmware 112, OS 116, and/or within one or more of applications 118.

As shown, electronic device 100 may include input devices and output devices that enable a user to interface with device 100. Those input devices and output devices can include microphone 108, hardware buttons 106a-n, and speaker 147. Microphone 108 may be used to receive spoken input/commands from a user. In one embodiment, microphone 108 includes multiple microphones. Hardware buttons 106a-n are selectable buttons which are used to receive manual/tactile input from a user to control specific operations of electronic device 100 and/or of applications executing thereon. In one embodiment, hardware buttons 106a-n may also include, or may be connected to, one or more sensors (e.g. a fingerprint scanner) and/or may be pressure sensitive. Hardware buttons 106a-n may also be directly associated with one or more functions of a graphical user interface (not pictured) and/or functions of an OS, application, or hardware of electronic device 100. In one embodiment, hardware buttons 106a-n may include a keyboard. Speaker 147 is used to output audio. In one embodiment, speaker 147 includes multiple speakers.

CPU 104 is also coupled to sensors 122a-n and display 145. Sensors 122a-n can include, but are not limited to including, at least one of: thermal/temperature sensors, noise sensors, motion sensors and/or accelerometers, proximity sensors, and/or camera sensors. Display 145 is capable of displaying text, media content, including images and video, and/or a graphical user interface (GUI) associated with or generated by firmware and/or one or more applications executing on electronic device 100. In one embodiment, display 145 includes at least one internal display/monitor of electronic device 100. In another embodiment, display 145 includes a projector module and/or lamp assembly for projecting content and/or media onto a remote surface (such as a wall or projection screen). In still another embodiment, display 145 includes at least one external display, such as a remotely connected monitor, that is connected to electronic device 100 via a wired and/or wireless connection. The GUI can be rendered by CPU 104 for viewing on display 145, in one embodiment, or can be rendered by a graphics processing unit (GPU) (not illustrated), in another embodiment. In one or more embodiments, display 145 is a touch screen that is also capable of receiving touch/tactile input from a user of electronic device 100, such as when the user is interfacing with a displayed (or partially displayed) GUI. In at least one embodiment, electronic device 100 can include a plurality of virtual buttons or affordances that operate in addition to, or in lieu of, hardware buttons 106a-n. For example, electronic device 100 can be equipped with a touch screen interface and provide, via a GUI, a virtual keyboard or other virtual icons for user interfacing therewith.

As shown, electronic device 100 also includes active cooling device 164. Active cooling device 164 is used to cool at least one heat-generating component of electronic device 100 and transfer heat generated by the at least one component to a surrounding environment external to electronic device 100. Active cooling device 164 can include, but is not limited to: thermoelectric cooling devices, electromagnetic cooling devices, oscillatory cooling devices, forced liquid cooling devices, and/or forced air/gas cooling devices such as radial/rotary fans and blowers. Active cooling device 164 can include motors and/or moving components that generate air-based noise and/or mechanical/vibrational noise which may be audible to a user of electronic device 100. In one or more embodiments, active cooling device 164 includes or is representative of multiple active cooling devices.

Applications 118 include thermal management utility (TMU) 119, which provides cooling profiles that are dynamically applied to active cooling device 164 and/or other components of electronic device 100 (e.g., CPU 104) to dissipate heat within electronic device 100. TMU 119 may autonomously select a particular cooling profile from among a plurality of cooling profiles based on current thermal conditions of electronic device 100. For example, TMU 119 may increase a speed of active cooling device 164 as a current temperature of CPU 104 rises. TMU 119 may also adjust an operational mode of components (e.g., CPU 104) of electronic device 100 based on thermal conditions of electronic device 100. For example, if thermal conditions within electronic device 100 exceed a predetermined threshold, TMU 119 may decrease a clock speed of CPU 104 and/or increase a cooling rate associated with active cooling device 164. In one embodiment, CMU 117 is an added utility provided as an extension of and/or within TMU 119.

Electronic device 100 also includes data port 132 (e.g., a universal serial bus (USB) port), battery 134, and charging circuitry 136. Data port 132 can operate as a charging port that receives power via an external charging device (not pictured) for charging battery 134 via charging circuitry 136. Data port 132 can operate as a charging port that provides power to an external device that is connected to data port 132 for charging a battery (not pictured) of the external device via charging circuitry 136. Battery 134 may include a single battery or multiple batteries for providing power to components of electronic device 100. In at least one embodiment, battery 134 includes at least one battery that is removable and/or replaceable by an end user. In another embodiment, battery 134 includes at least one battery that is permanently secured within/to electronic device 100. Data port 132 may also function as one of an input port, an output port, and a combination input/output port.

Electronic device 100 may also include global positioning satellite (GPS) receiver 138 and one or more wireless radios 140a-n. GPS 138 may be coupled to at least one of antenna(s) 148a-n to enable electronic device 100 to determine its current location and/or rate of travel. Wireless radios 140a-n may also be coupled to one or more of antenna(s) 148a-n to enable electronic device 100 to wirelessly connect to, and transmit and receive voice and/or data communication to/from, one or more other devices, such as devices 152a-n and server 154. As a wireless device, device 100 can transmit data over a wireless network 150 (e.g., a Wi-Fi network, cellular network, Bluetooth® network (including Bluetooth® low energy (BLE) networks), a wireless ad hoc network (WANET), or personal area network (PAN)). In one embodiment, electronic device 100 may be further equipped with infrared (IR) device (not pictured) for communicating with other devices using an IR connection. In another embodiment, wireless radios 140a-n may include a short-range wireless device, including, but not limited to, a near field communication (NFC) device. In still another embodiment, electronic device 100 may communicate with one or more other device(s) using a wired or wireless USB connection.

Figure 2:
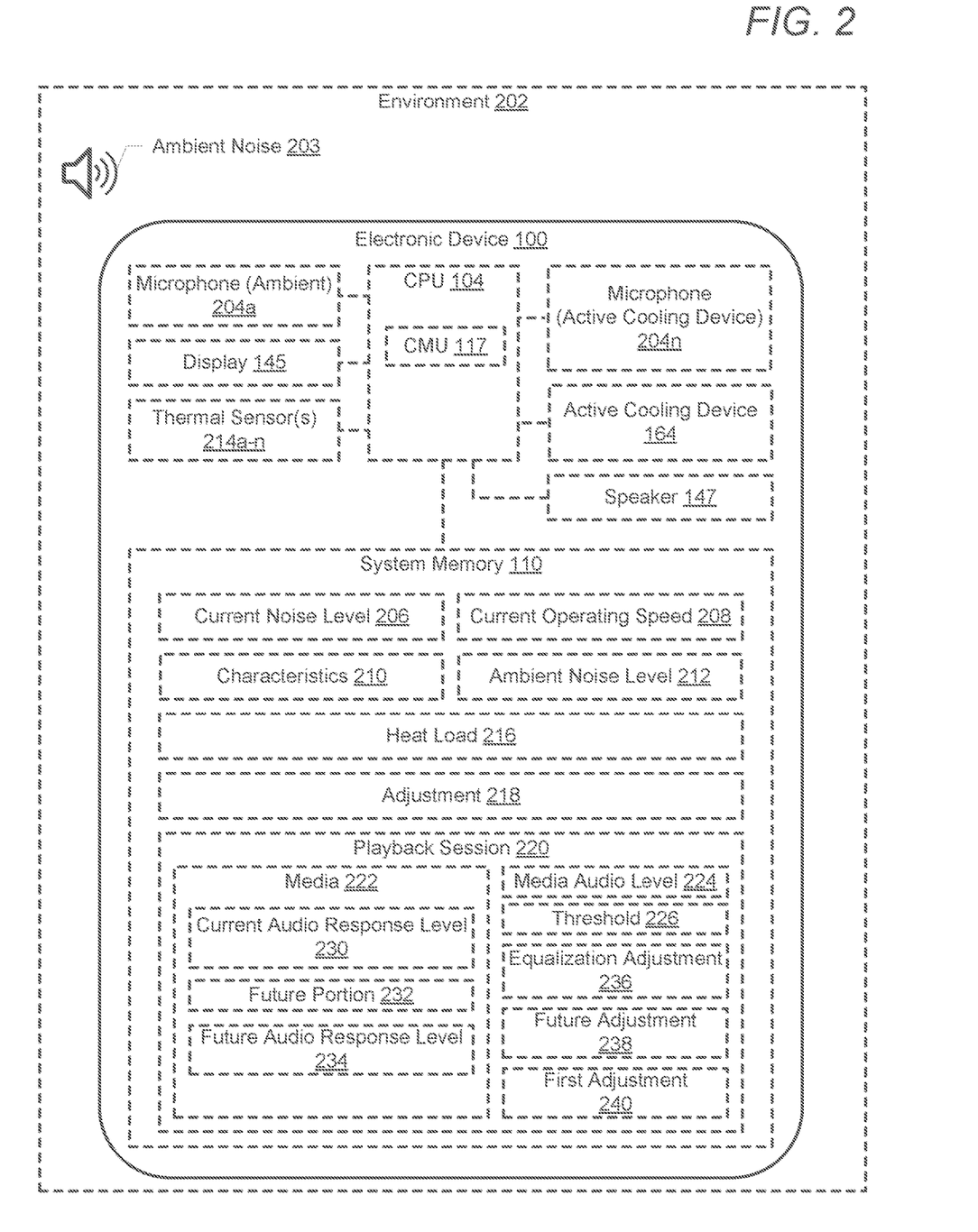
FIG. 2 illustrates an example electronic device having active cooling devices, in accordance with one or more embodiments.

FIG. 2 is a block diagram illustrating additional functional components within example electronic device 100, in accordance with one or more embodiments of the present disclosure. As illustrated, electronic device 100 includes CPU 104, which executes CMU 117. Electronic device 100 also includes system memory 110, display 145, speaker 147, active cooling device 164, microphones 204a-n, and thermal sensors 214a-n. Display 145 is utilized to present media content (e.g., images and/or video) and/or a user interface/GUI. Speaker 147 is utilized to playback audio from electronic device 100. Active cooling device 164 is utilized to cool at least one component of electronic device 100 and transfer heat generated by the at least one component to a surrounding environment external to electronic device 100. In one embodiment, active cooling device 164 is coupled directly to at least one component of electronic device 100. For example, active cooling device 164 may be a CPU fan that is directly attached to CPU 104. In another embodiment, active cooling device 164 may be oriented on an enclosure of electronic device 100 in order to simultaneously cool multiple components of electronic device 100. In one embodiment, active cooling device 164 may be used to expel heat originating within electronic device 100. In another embodiment, active cooling device 164 may be used to blow cool air from environment 202 across at least one component of electronic device 100. In one or more embodiments, active cooling device 164 may also include passive cooling components, such as a heat sink.

Microphones 204a-n are utilized to capture audio. In one embodiment, at least one of microphones 204a-n is utilized to measure ambient noise level 212 associated with ambient noise 203 within environment 202. In another embodiment, at least one of microphones 204a-n is utilized to determine current noise level 206. Current noise level 206 identifies a real-time level of noise generated by active cooling device 164 and/or components of electronic device 100. Current noise level 206 includes at least one of air-based noise, vibrational noise, and/or rotational noise generated by active cooling device 164. In one or more embodiments, current noise level 206 represents a level of noise generated by active cooling device 164 and/or components of electronic device 100 within at least one critical band. A critical band is a particular range of audio frequencies for which at least one other audio tone may mask or interfere with the recognition of tones in the critical band to the human ear. Thus, the second tone may reduce the loudness, intensity, and/or perception of tones in the critical band to a human listener. In another embodiment, current noise level 206 is associated with an overall noise level associated with the noise generated by active cooling device 164 and/or components of electronic device 100.

Thermal sensors 214*a-n* are utilized to measure heat load 216 of electronic device 100. In one embodiment, thermal sensors 214*a-n* are utilized to measure a temperature at one or more points and/or at one or more components of electronic device 100. In another embodiment, thermal sensors 214*a-n* measure a temperature of environment 202.

Based on current noise level 206, ambient noise level 212, and heat load 216, CPU 104 calculates adjustment 218 for active cooling device 164. Adjustment 218 mitigates heat load 216 and minimizes audible noise generated by active cooling device 164 relative to ambient noise level 212. In one or more embodiments, adjustment 218 increases or decreases a voltage (e.g., fan voltage) and or pulse width modulation (PWM) of a signal provided to active cooling device 164 to proportionally increase or decrease a level or rate of cooling provided by active cooling device 164.

In one embodiment, CPU 104 determines current noise level 206 by measuring, via a microphone, noise generated by active cooling device 164. In one embodiment, current noise level 206 can be measured using any microphone (e.g., microphones 204*a-n*) of electronic device 100. In another embodiment, electronic device 100 includes a dedicated microphone (e.g., microphone 204*n*) for measuring current noise level 206. In one or more embodiments, microphone 204*n* is positioned adjacent and/or proximate to active cooling device 164.

In another embodiment, CPU 104 calculates/determines current noise level 206 based on current operating speed 208 of active cooling device 164 and characteristics 210. Characteristics 210 identify operating parameters of active cooling device 164. In one or more embodiments, characteristics 210 identify a typical and/or estimated noise level of active cooling device 164 at each of a plurality of speeds. In one or more embodiments, current operating speed 208 of a particular active cooling device (e.g., an axial fan) can be determined based on an input voltage (e.g. fan voltage) being applied to that active cooling device. For example, characteristics 210 may identify a fan speed of 500 revolutions per minute (RPM) as corresponding to a decibel (dB) level of 28. In response to measuring current operating speed 208 at 500 RPM, CPU 104 determines current noise level 206 as 28 dB. In one embodiment, characteristics 210 includes a table that can be utilized to lookup determine current noise level 206 based on a known voltage of active cooling device 164 and/or current operating speed 208. In another embodiment, characteristics 210 includes at least one algorithm that may be used to calculate current noise level 206 based on a known voltage and/or current operating speed 208 of active cooling device 164.

Figure 3:
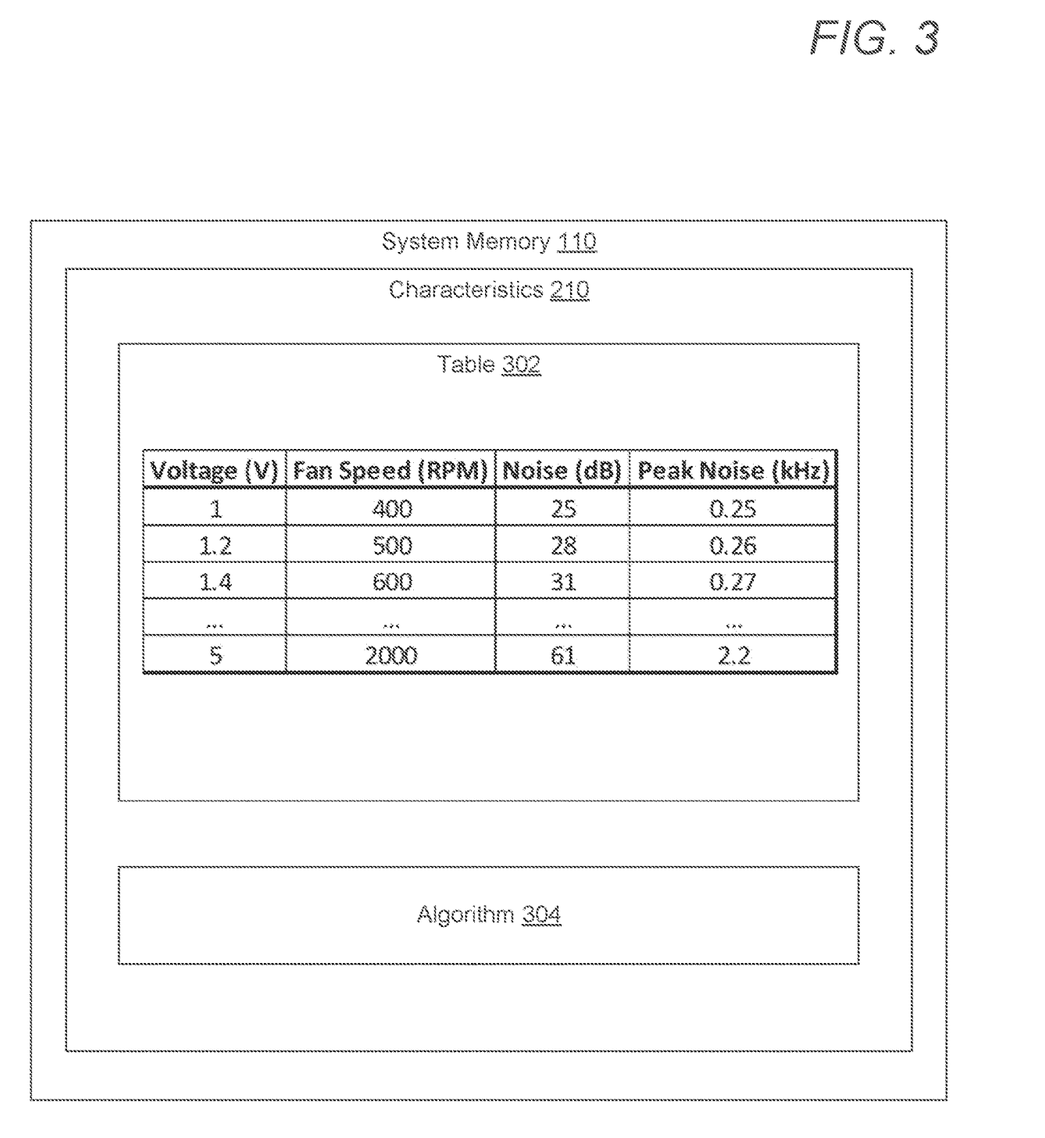
FIG. 3 illustrates sample characteristics stored within memory of an electronic device, in accordance with one or more embodiments.

Referring now to FIG. 3, there is illustrated sample characteristics that may be stored within memory of an electronic device, in accordance with one or more embodiments. As illustrated, memory 110 includes characteristics 210. Characteristics 210 include table 302, which provides a correlation between a voltage (V), speed (RPM), and noise (dB) at a plurality of levels for active cooling device 164. Characteristics 210 may also include algorithm 304 which can be utilized to calculate a current noise level (e.g., current noise level 206) of an active cooling device (e.g., active cooling device 164) based on a current voltage and/or current operating speed 208 of active cooling device 164. In another embodiment, table 302 can also identify a peak frequency, average frequency, and/or range of frequencies associated with each identified noise level. For example, table 302 illustrates that at 5V that the fan speed is 2000 RPM and the fan noise is 61 dB at a peak noise frequency of 2.2 kHz. It should be noted that characteristics 210 may include multiple tables and/or algorithms. For example, characteristics 210 may include a table and/or algorithm for each of a plurality of active cooling devices of electronic device 100.

Referring again to FIG. 2, CPU 104 determines ambient noise level 212 by recording and/or monitoring ambient noise 203 via at least one of microphones 204*a-n*. Ambient noise 203 is analyzed to determine ambient noise level 212. In one embodiment, ambient noise level 212 represents an average noise in environment 202 during the recorded period. In another embodiment, ambient noise level 212 represents a peak noise level in environment 202 during the recorded period. In one or more embodiments, ambient noise level 212 represents a noise level of environment 202 that is constrained to at least one predefined and/or typical audio spectrum (e.g., human audio spectrum of 20 hertz to 20 kilohertz) and/or at least one frequency subband and/or critical band (as described in greater detail below).

CPU 104 determines heat load 216 based on thermal measurements captured by thermal sensors 214*a-n*. Heat load 216 includes heat generated by at least one heat generating device (e.g., CPU 104) within electronic device 100. Heat load 216 may also include internal temperature conditions of electronic device 100 and/or temperature conditions at an external surface of electronic device 100. In one or more embodiments, CPU 104 continually and/or periodically tracks heat load 216 during operation of electronic device 100. In one embodiment, thermal sensors 214*a-n* are utilized to measure internal thermal conditions, such a temperature of CPU 104 or a temperature at a particular point on the interior or exterior of electronic device 100. In another embodiment, thermal sensors 214*a-n* are utilized to measure external thermal conditions, such a temperature of environment 202. In one or more embodiments, thermal sensors 214*a-n* may be incorporated within components of electronic device 100. For example, CPU 104 may have a built in thermal sensor (e.g., thermal sensor 214*a*).

CPU 104 calculates adjustment 218 for the at least one active cooling device based on current noise level 206, ambient noise level 212, and heat load 216. Adjustment 218 provides an optimal and/or improved operating level for active cooling device 164 that mitigates heat load 216 and minimizes audible noise (e.g., current noise level 206) generated by at least one active cooling device 164 relative to ambient noise level 212. Adjustment 218 may increase or decrease current operating speed 208 and/or a level of cooling provided by active cooling device 164. For example, adjustment 218 modifies current operating speed 208 of active cooling device 164 to a particular level that mitigates heat load 216 and that maintains current noise level 206 under ambient noise level 212. In another embodiment, adjustment 218 modifies current operating speed 208 of active cooling device 164 to a particular level that mitigates heat load 216 and that maintains current noise level 206 to a level that is less than a current media audio level 224 associated with a playback session 220 of media 222, as described in greater detail below. In one more embodiments, adjustment 218 modifies current operating speed 208 of active cooling device 164 to ensure internal or external temperatures of electronic device 100 do not exceed temperature thresholds. For example, adjustment 218 may modify current operating speed 208 of active cooling device 164 to a minimum speed that will maintain a normal operating temperature of CPU 104 under 45 degrees Celsius (° C.). It should be noted that for devices having multiple active cooling devices, adjustment 218 may independently increase or decrease current operating speed 208 for each active cooling device. Additionally, in devices having multiple active cooling devices, adjustment may exclude adjustments to the current operating speed of at least one active cooling device, while increasing or decreasing the current operating speed of other active cooling devices.

It should be noted that in one or more embodiments, current noise level 206, ambient noise level 212, and heat load 216, are continually monitored by CPU 104. In these embodiments, adjustment 218 is dynamically modified while electronic device is running to ensure heat load 216 is continually mitigated and current noise level 206 is minimized relative to ambient noise level 212.

In one or more embodiments, adjustment 218 also considers a current performance and/or operating mode of electronic device 100. For example, CPU 104 calculates adjustment 218 to modify current operating speed 208 to a first speed when electronic device 100 is configured in a high-performance state. In another example, CPU 104 calculates adjustment 218 to modify current operating speed 208 to a second speed when electronic device 100 is configured in a battery-saving state.

Adjustment 218 may be further modified by CPU 104 based on current audio response level 230 of media 222 within current playback session 220. Media 222 may include time-varying content (such as an audio clip or video) and/or non-time-varying content (such as a still image). Media 222 may include audio content (e.g., music and/or speech), visual content (e.g., images and/or video), or any combination thereof. In this embodiment, media 222 includes at least one audio content (e.g., music and/or speech). Media 222 may be stored in memory of electronic device 100 and/or may be streamed to electronic device from another device (such as a server or cloud service). In another embodiment, media 222 may include voice calls and/or video calls. In another embodiment, media 222 may also include images, video, and/or audio associated with a software, such as a video game. CPU 104 identifies current playback session 220 and analyzes media 222 within current playback session 220 to determine current audio response level 230. Current audio response level 230 is a measurement of a peak and/or average volume across a particular audio spectrum (e.g., human audio spectrum) for a current portion of media 222 within current playback session 220. For example, CPU 104 may determine current audio response level 230 to be 50 dB. CPU 104 can calculate adjustment 218 which modifies current operating speed 208 of active cooling device 164 to a new speed that mitigates heat load 216 and audibly masks current noise level 206 of active cooling device 164 to a level that is less than 50 dB. In response to calculating adjustment 218, CPU 104 applies adjustment 218 to active cooling device 164.

In another embodiment, current audio response level 230 may be further determined based on a current volume level of playback session 220 as output by speaker 147 of electronic device 100. The current volume level may correspond to an average volume level, peak volume level, and/or a current volume level of playback session 220 (as output by speaker 147) within at least one critical band. In this embodiment, adjustment 218 further modifies current operating speed 208 of active cooling device 164 to a new speed that also audibly masks current noise level 206 of active cooling device 164 to a level that is less than the current volume level of electronic device 100. The current volume level can be determined from a setting within at least one program executing on electronic device 100 and/or a current volume level setting of a speaker (e.g., speaker 147) coupled to electronic device 100. In another embodiment, the current volume level is an output volume from a speaker (e.g., speaker 147) that is measured by a microphone (e.g., microphone 108). CPU 104 identifies current playback session 220 of media 222 and measures, via at least one microphone (e.g., microphone 108), a current level of audio output of media 222 at a speaker (e.g., speaker 147) of electronic device 100. CPU 104 compares current noise level 206 of active cooling device 164 to the level of audio output by speaker 147 and determines whether the current noise level 206 exceeds a noise threshold (not illustrated) relative to the current level of audio output by speaker 147. In one embodiment, the noise threshold is a volume level corresponding to the current level of audio output at speaker 147. In another embodiment, the noise threshold is a percentage (e.g., 90%) of the volume level corresponding to the current level of audio output at speaker 147. In response to determining current noise level 206 exceeds the noise threshold, CPU 104 calculates adjustment 218 based on current noise level 206, the current level of audio output, ambient noise level 212, and heat load 216.

In one embodiment, CPU 104 also performs a spectral analysis on at least one future portion of media 222 to identify future portion 232 having a corresponding future audio response level 234 that is different from current audio response level 230 and/or that exceeds a particular variance (e.g., ±10%) in audio response level from current audio response level 230. In response to identifying at least one future portion of media having a different audio response level, CPU 104 further determines whether future audio response level 234 represents an increase or decrease to current audio response level 230. In a first example, CPU 104 analyzes a next ten minutes of media 222 to identify a forty-five second future portion (future portion 232) at time in media 222 that is four minutes in the future (+4:00 to +4:45) and which has a future audio response level (future audio response level 234) of 57 dB. In a second example, CPU 104 analyzes the next ten minutes of media 222 to identify future portion 232 within a +6:15 to +7:00 minute portion of media 222 having future audio response level 234 of 42 dB. In one embodiment, future portion 232 can be identified based on future portion 232 having a peak audio response level or average audio response level that is different from current audio response level (an/or that exceeds a particular variance). In another embodiment, future portion 232 can be identified based on future portion 232 having a peak audio response level or average audio response level that is different from current audio response level within at least one particular critical band. In one embodiment, the at least one particular critical band may correspond to at least one peak noise frequency identified within characteristics 210 and/or table 302 (as illustrated in FIG. 3).

In response to determining future audio response level 234 represents an increase to current audio response level 230, CPU 104 determines whether at least one future adjustment 238 exists for active cooling device 164. Future adjustment 238 is at least one scheduled future increase to a level of cooling performance of active cooling device 164. In one embodiment, CPU 104 may query TMU 117 to determine future adjustment 238 for active cooling device 164 is scheduled for a time before future portion 232 (e.g., at time +2:45 of media 222). For example, CPU 104 may determine future adjustment 238, which is a scheduled increase to the level of cooling performance of active cooling device 164 at time that is two minutes and forty five seconds in the future (+2:45) in playback session 220 of media 222. In response to identifying future adjustment 238 for active cooling device 164, CPU 104 delays future adjustment 238 until playback session 220 reaches future portion 232 (e.g., +4:00 to +4:45 of media 222 in the first example above). In this embodiment, the delay of future adjustment 238 allows heat load 216 to increase during the current "quieter" portion of media 222 (the portion prior to future portion 232) in order to mitigate current noise level 206 prior to future portion 232. This embodiment further enables an increase of the level of cooling performance associated with active cooling device 164 during the future "louder" portion (future portion 232) during which time the increased noise of active cooling device 164 is mitigated by future audio response level 234. CPU 104 monitors playback session 220 for the start of future portion 232. In response to determining playback session 220 has reached future portion 232, CPU 104 applies the future adjustment 238 to active cooling device 164.

In another embodiment, CPU 104 may further estimate a future heat load at the start of future portion 232 should the at least one scheduled future increase be delayed until the start of future portion 232. In response to determining that delaying the scheduled future increase will cause the future heat load to exceed internal or external temperature thresholds, CPU 104 may not delay the at least one scheduled future increase. In another embodiment, in response to determining that the future heat load will cause the future heat load to exceed internal or external temperature thresholds, CPU 104 calculates, for adjustment 218, at least one alternative cooling adjustment for one or more components of electronic device 100 that mitigates heat load 216 until playback session 220 reaches future portion 232 (when future portion 232 becomes the current portion). For example, in this embodiment adjustment 218 may throttle a clock speed of CPU 104 and/or system memory 110 to a lower rate. In one or more embodiments, future adjustment 238 overwrites/replaces adjustment 218.

In response to determining future audio response level 234 represents a decrease to current audio response level 230, CPU 104 calculates first adjustment 240 which temporarily increases a level of cooling performance associated with active cooling device 164 until playback session 220 reaches future portion 232. First adjustment 240 mitigates heat load 216 and audibly masks current noise level 206 of active cooling device 164 relative to current audio response level 230 of playback session 220. In one or more embodiments, first adjustment 240 immediately increases the level of cooling performance associated with active cooling device 164 to "pre-cool" electronic device 100 during a current, louder portion of media 222 prior to a future quieter portion of media 222 (future portion 232). In response to calculating first adjustment 240, CPU 104 applies first adjustment 240 to active cooling device 164. CPU 104 also calculates adjustment 218 for the future portion having the decreased audio response level (e.g., +6:15 to +7:00 of media 222 in the second example above). In this embodiment, adjustment 218 decreases a level of cooling performance associated with active cooling device 164 to audibly mask a noise level of active cooling device 164 during future portion 232 relative to future audio response level 234. CPU 104 monitors playback session 220 for the start of future portion 232 (when future portion 232 becomes the current portion). In response to determining playback session 220 has reached future portion 232, CPU 104 applies adjustment 218 to active cooling device 164. In one or more embodiments, adjustment 218 is applied for the duration of future portion 232 and overwrites/replaces first adjustment 240.

In one or more embodiments, adjustment 218 may be further modified by CPU 104 based on future audio response level 234. In these embodiments, CPU 104 calculates sound equalization adjustment 236 that can be applied to media 222 during the playback of future portion 232. Sound equalization adjustment 236 modifies future audio response level 234 for future portion 232 to ensure that audio emitted by speaker 144 during future portion 232 audibly masks current noise level 206 of active cooling device 164 during future portion 232. Sound equalization adjustment 236 can include one or more increases and/or one or more decreases to an output level/volume of media 222 at one or more frequencies and/or frequency ranges during future portion. For example, sound equalization adjustment 236 increases the output level of media 222 in the 2.1 kHz-3.0 kHz range during future portion 232 to mask 2.5 kHz air-based noise generated by active cooling device 164. In another embodiment, sound equalization adjustment 236 account for harmonics associated of the noise generated by active cooling device 164.

CPU 104 monitors playback session 220 for the start of future portion 232. In response to determining playback session 220 has reached future portion 232, CPU 104 applies sound equalization adjustment 236 to media 222. In one or more embodiments, sound equalization adjustment 236 is applied to media 222 for the duration of future portion 232. It should be noted that in one or more embodiments, CPU 104 may apply both sound equalization adjustment 236 and adjustment 218 during a same time period (e.g., during future portion 232).

In one or more embodiments, current noise level 206 of active cooling device 164 may change based on a change in temperature of active cooling device 164, a current age of active cooling device 164, and/or duration of rotation of active cooling device 164. In those embodiments, CPU 104 may further modify adjustment 218 and/or sound equalization adjustment 236 based on the change in temperature, current age, and/or duration of rotation of active cooling device 164.

Figure 4:
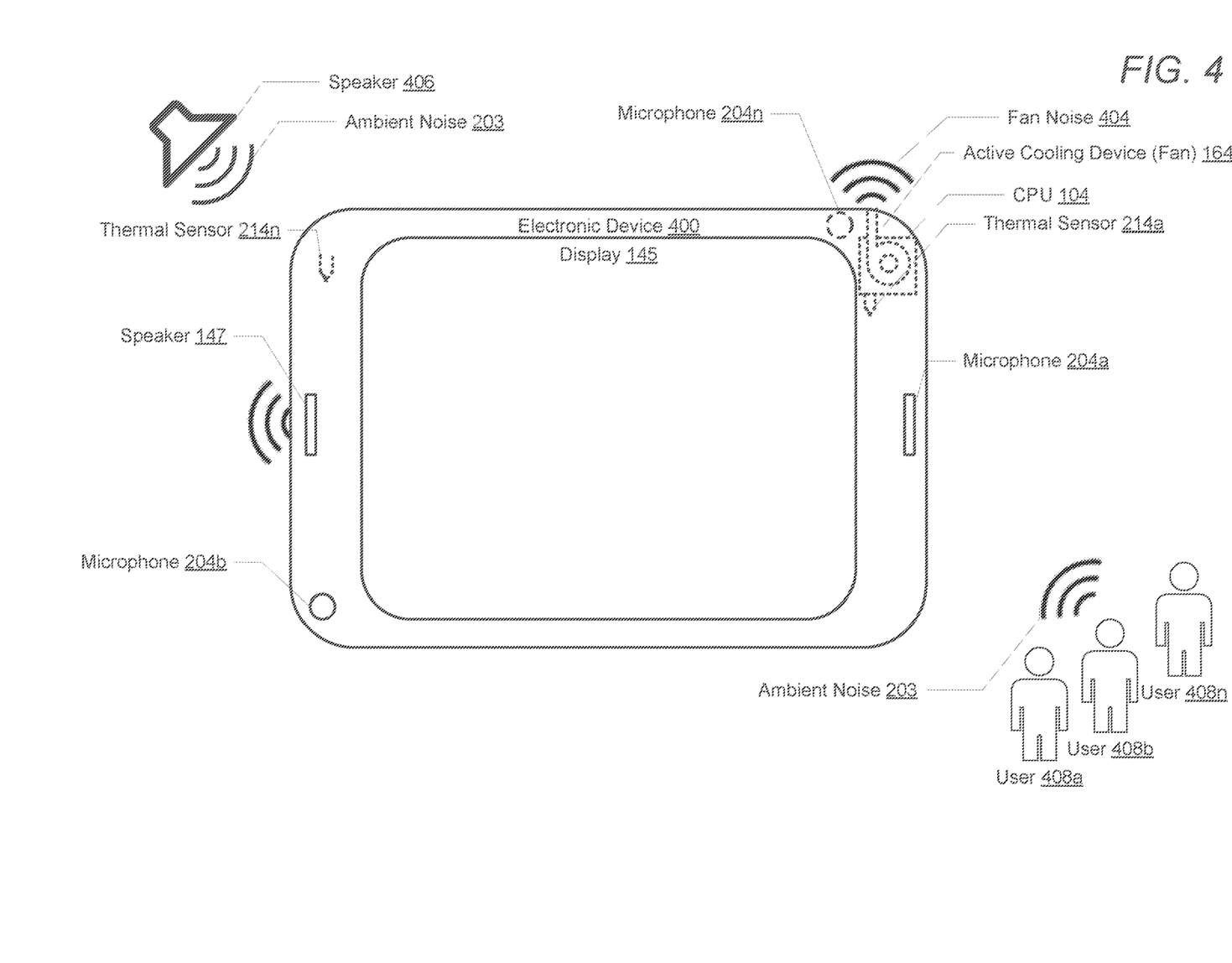
FIG. 4 illustrates a sample electronic device having an active cooling device, in accordance with one embodiment.

FIG. 4 illustrates an example electronic device having an active cooling device, in accordance with one or more embodiments. As depicted, electronic device 400 includes CPU 104, display 145, speaker 147, active cooling device 164, microphones 204*a-n*, and thermal sensors 214*a-n*. In the illustrated embodiment, active cooling device 164 is a cooling fan that is attached to CPU 104 and which generates fan noise 404. Thermal sensor 214*a* measures a current temperature and/or heat load of CPU 104 and/or heat load of electronic device 400. Thermal sensor 214*n* measures an internal temperature and/or heat load generated by components of electronic device 400. Microphone 204*n* is an internal microphone that monitors a current noise level (e.g., current noise level 206) of active cooling device 164. Speaker 406 and Users 408*a-n* generate ambient noise 203. Microphones 204*a-n* can each be utilized to detect and measure ambient noise 203 and/or to receive spoken input/commands from a user (e.g., user 408*a*). Speaker 147 can be utilized to playback audio content associated with media (e.g., media 222 of FIG. 2) during a playback session (e.g., playback session 220 of FIG. 2).

Figure 5:
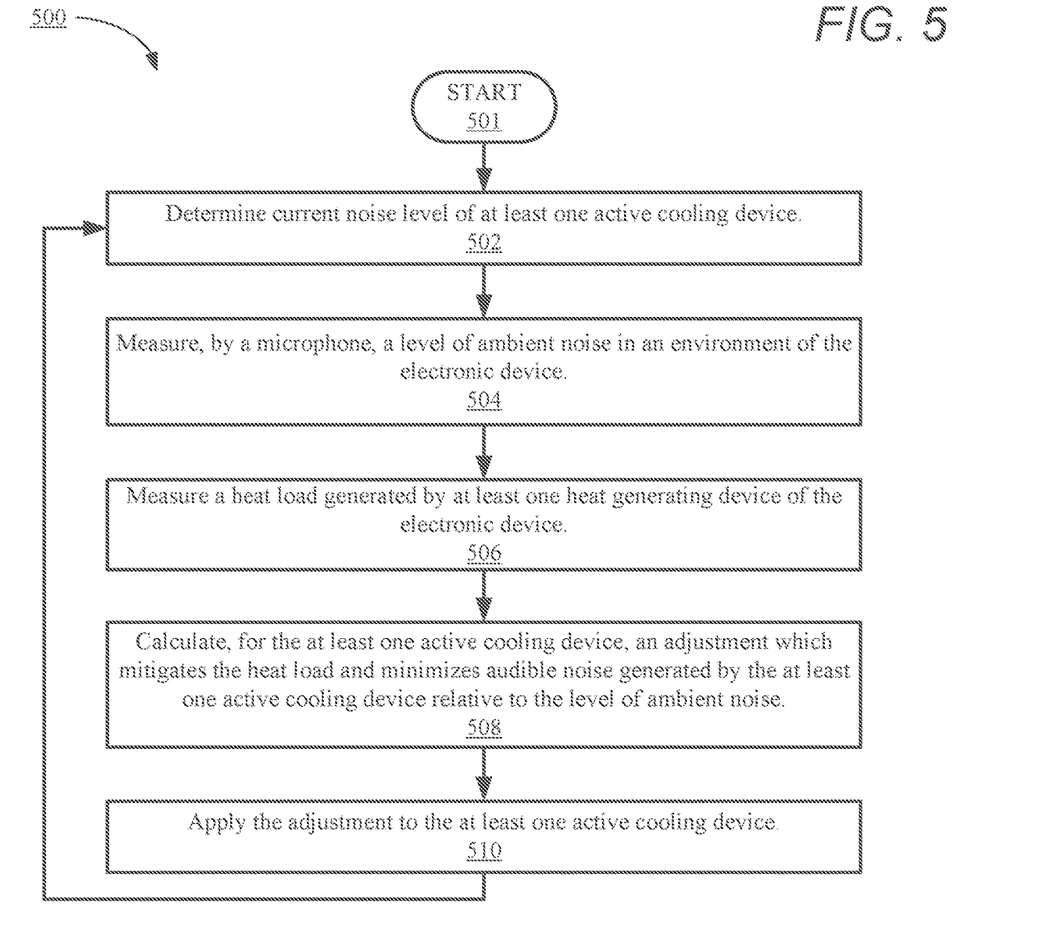
FIG. 5 is a flow chart illustrating a method for managing noise generated by active cooling devices, in accordance with one or more embodiments.
Figure 6:
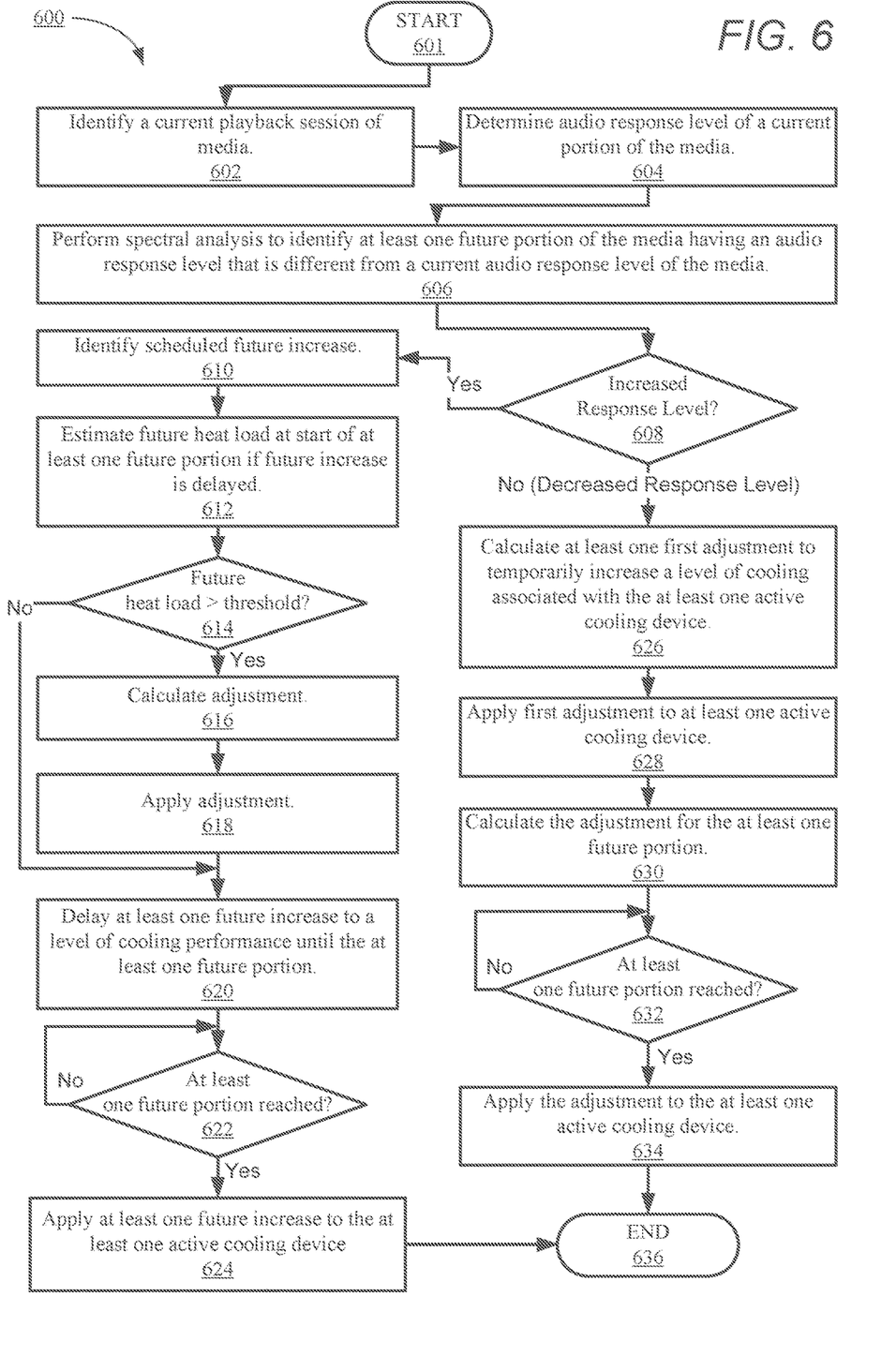
FIG. 6 is a flow chart illustrating a method for managing noise generated by active cooling devices during future portions of a media playback session, in accordance with one or more embodiments.
Figure 7:
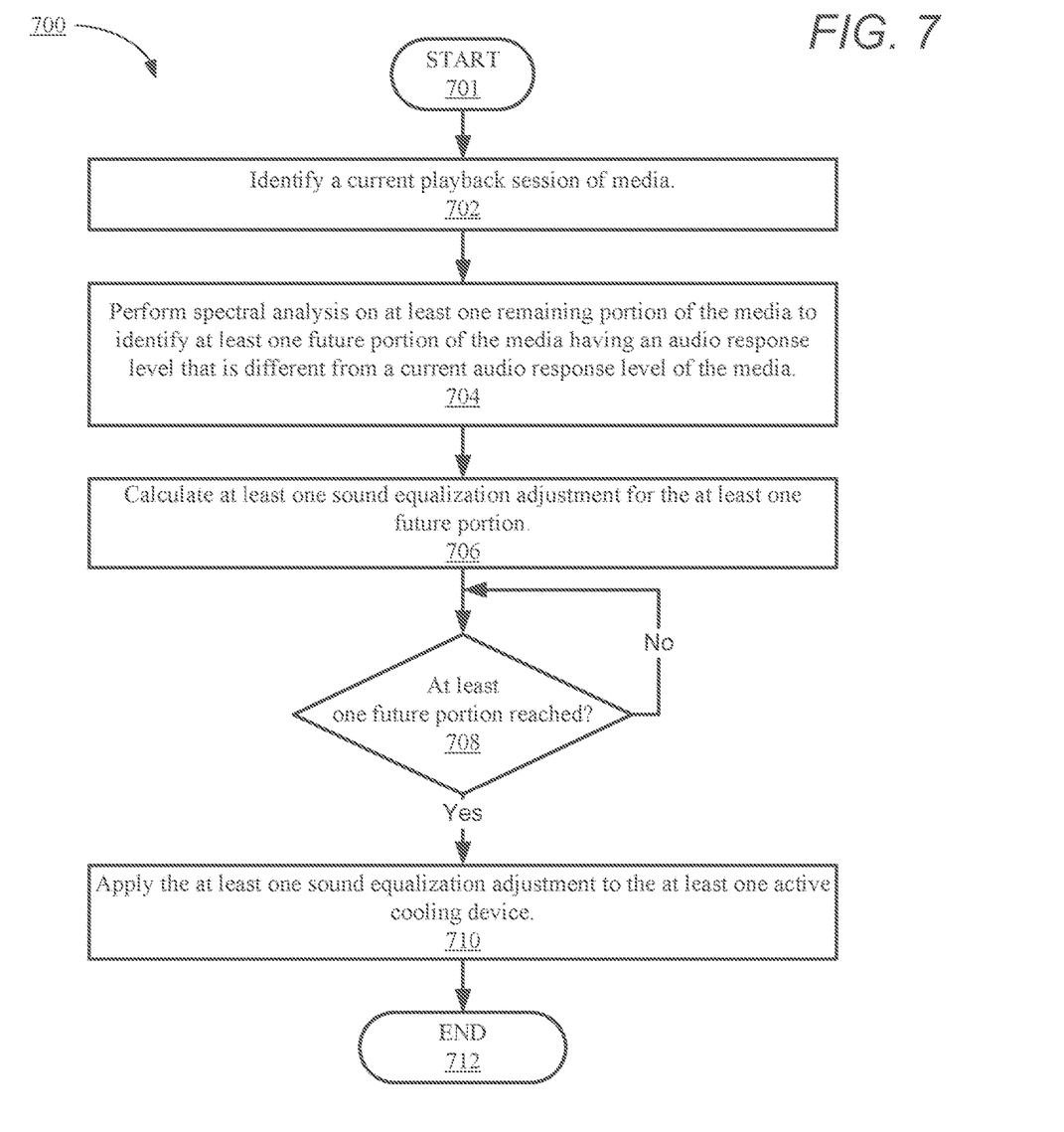
FIG. 7 is a flow chart illustrating a method for applying sound equalization adjustments to manage noise generated by active cooling devices, in accordance with one or more embodiments.

Referring now to FIGS. 5-7, aspects of the methods are described with reference to the components of FIGS. 1-4. Several of the processes of the methods provided in FIGS. 5-7 can be implemented by a processor (e.g., CPU 104) executing software code (i.e., program instructions) of CMU 117 within a device (e.g., electronic device 100). The method processes described in FIGS. 5-7 are generally described as being performed by components of electronic device 100.

Referring now to FIG. 5, there is depicted a flow chart illustrating a method for managing noise generated by active cooling devices, in accordance with one or more embodiments of the present disclosure. Method 500 commences at initiator block 501 then proceeds to block 502. At block 502, CPU 104 determines a current noise level (e.g., current noise level 206) of at least one active cooling device of the electronic device. At block 504, CPU 104 measures, by a microphone (e.g., microphone 204a) an ambient noise level (e.g., ambient noise level 212) in an environment (e.g., environment 202) of the electronic device. At block 506, CPU 104 measures a heat load (e.g., heat load 216) generated by at least one heat generating device (e.g., CPU 104) of the electronic device. At block 508, CPU 104 calculates an adjustment (e.g., adjustment 218) for the at least one active cooling device based on the level of ambient noise and the measured heat load and current noise level. The adjustment mitigates the heat load and minimizes audible noise generated by the at least one active cooling device relative to the level of ambient noise. At block 510, CPU 104 applies the adjustment to the at least one active cooling device. Method 500 then continues back to block 502 in an iterative manner.

Referring now to FIG. 6, there is depicted a flow chart illustrating a method for managing noise generated by active cooling devices during future portions of a media playback session, in accordance with one or more embodiments of the present disclosure. In one or more embodiments, the features and/or functionality provided by method 600 may be performed at steps 508-510 of method 500 (as described in FIG. 5, above). Method 600 commences at initiator block 601, then proceeds to block 602. At block 602, CPU 104 identifies a current playback session (e.g., current playback session 220) of media (e.g., media 222). At block 604, CPU 104 determines a current audio response level (current audio response level 230) of a current portion of the media within the playback session. CPU 104 also performs a spectral analysis on at least one remaining/future portion of the media to identify at least one future portion (e.g., future portion 232) of the media that has an audio response level (e.g., future audio response level 234) that is different from a current audio response level (block 606). At decision block 608, CPU 104 determines whether the audio response level of the future portion represents an increase or decrease to the current audio response level. The increase or decrease relative to the current audio response level may be determined based on a difference in peak audio response level, average audio response level, and/or a change (an increase or decrease) in audio response level within at least one particular critical band.

In response to determining the audio response level of the future portion represents an increase to the current audio response level, CPU 104 identifies a scheduled future adjustment (e.g., future adjustment 238) for active cooling device 164 at a time in the playback session prior to the at least one future portion (block 610). At block 612, CPU 104 estimates a future heat load at the start of the at least one second/future portion should the at least one scheduled future increase be delayed until the start of future portion 232. At decision block 614, CPU 104 determines whether delaying the scheduled future increase will cause the future heat load to exceed internal or external temperature thresholds. In response to determining (at decision block 614) that delaying the scheduled future increase will cause the future heat load to exceed internal or external temperature thresholds, method 600 continues to block 616. At block 616, CPU 104 calculates an adjustment (e.g., adjustment 218, that includes at least one alternative cooling adjustment (e.g., a reduction in clock speed for CPU 104) for one or more components of electronic device 100 that mitigates heat load (e.g., heat load 216) of electronic device 100 until playback session 220 reaches future portion 232. At block 618, CPU 104 applies the adjustment to electronic device 100. At block 620, CPU 104 delays the at least one scheduled future increase until the current playback session reaches the future portion. At decision block 622, CPU 104 determines whether the current playback session has reached the future portion. In response to determining (at block 622) that the current playback session has reached the future portion, CPU 104 applies the future adjustment (without any further delay) to the at least one active cooling device (block 624). Method 600 then ends at block 636.

In response to determining (at block 614) that delaying the scheduled future increase will not cause the future heat load to exceed internal or external temperature thresholds, method 600 continues to block 620 in which CPU 104 delays the at least one scheduled future increase until the current playback session reaches the future portion. At block 622, CPU 104 determines whether the current playback session has reached the future portion. In response to determining (at block 622) that the current playback session has reached the future portion, CPU 104 applies the future adjustment to the at least one active cooling device (block 624). Method 600 then ends at block 636.

In response to determining at decision block 608 that the audio response level of the future portion represents a decrease to the current audio response level, CPU 104 calculates a first adjustment (e.g., first adjustment 240) to the at least one active cooling device (block 626). The first adjustment temporarily increases a level of cooling performance associated with the at least one active cooling device until the current playback session reaches the at least one future portion. The first adjustment also audibly masks the noise level of the at least one active cooling device relative to the current audio response level of the current playback session. At block 628, CPU 104 applies the first adjustment to the at least one active cooling device. At block 630, CPU 104 calculates, for the future portion, a scheduled future adjustment (e.g., future adjustment 228) to the cooling performance level associated with the at least one active cooling device. The future adjustment decreases a level of cooling performance associated with the at least one active cooling device. The future adjustment also audibly masks the noise level of the at least one active cooling device relative to the decreased audio response level during the future portion. At decision block 632, CPU 104 determines whether the current playback session has reached the future portion. In response to determining the current playback session has reached the future portion, CPU 104 applies the scheduled future adjustment to the at least one active cooling device (block 634). In one or more embodiments, the scheduled future adjustment is applied for the duration of the future portion. Method 600 then ends at block 636.

Referring now to FIG. 7, there is depicted a flow chart illustrating a method for applying sound equalization adjustments to manage noise generated by active cooling devices, in accordance with one or more embodiments. Referring In one or more embodiments, the features and/or functionality provided by method 700 may be performed at steps 508-510 of method 500 (as described in FIG. 5, above). Method 700 commences at initiator block 701 then proceeds to block 702. At block 702, CPU 104 identifies a current playback session (e.g., current playback session 220) of media (e.g., media 222). At block 704, CPU 104 performs a spectral analysis on at least one remaining/future portion of the media to identify at least one future portion (e.g., future portion 232) of the media that has an audio response level (e.g., future audio response level 234) that is different from a current audio response level. At block 706, CPU 104 calculates, based on the current audio response level, the audio response level during the at least one future portion, the level of ambient noise, and the heat load, at least one sound equalization adjustment (e.g., equalization adjustment 236) that can be applied to the at least one active cooling device (e.g., active cooling device 164) during the playback of the at least one future portion of the media. The at least one sound equalization adjustment modifies an output frequency response of the at least one future portion of the media to audibly mask the noise level of the at least one active cooling device relative to the audio response level during the at least one future portion. At decision block 708, CPU 104 determines whether the current playback session has reached the future portion. In response to determining that the current playback session has reached the at least one future portion, CPU 104 applies the at least one sound equalization adjustment to the media for the duration of the at least one future portion (block 710). Method 700 then ends at block 712.

In the above-described flow charts of FIG. 5-7, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   determining a current noise level of at least one active cooling device of an electronic device;
   measuring a level of ambient noise within a surrounding environment by at least one microphone of the electronic device;
   identifying at least one future portion of a current playback session of media, the future portion having an audio response level that is a change from a current audio response level of a current portion of the media, the identifying completed via spectral analysis on at least one remaining portion of the media after the current portion;
   measuring, via at least one thermal sensor, a heat load generated by at least one heat generating device of the electronic device;
   in response to identifying the at least one future portion, calculating at least one adjustment based, at least in part, on the current audio response level, the audio response level during the at least one future portion, the level of ambient noise, and the heat load; and
   applying, to the at least one active cooling device, the at least one adjustment that mitigates the heat load and minimizes audible noise generated by the at least one active cooling device relative to the level of ambient noise and the audio response level;
   wherein the at least one adjustment modifies a level of cooling performance associated with the at least one active cooling device to audibly mask the noise level of the at least one active cooling device relative to the audio response level during the at least one future portion.

2. The method of claim 1, wherein determining the current noise level of the at least one active cooling device further comprises:
   measuring, by the at least one microphone of the electronic device, the current noise level of the at least one active cooling device.

3. The method of claim 1, wherein determining the current noise level of the at least one active cooling device further comprises:
   determining a current operating speed of the at least one active cooling device; and
   estimating the current noise level based on the current operating speed and known operating parameters of the at least one active cooling device.

4. The method of claim 1, further comprising:
   identifying a current playback session of media on the electronic device, the media comprising a time-varying content;
   measuring, via the at least one microphone, a current level of audio output of the media at a speaker of the electronic device;
   comparing the current noise level of the at least one active cooling device to the level of audio output by the speaker;
   determining whether the current noise level exceeds a noise threshold relative to the current level of audio output by the speaker; and
   in response to determining the current noise level exceeds the noise threshold, calculating the at least one adjustment based on the current noise level, the current level of audio output, the level of ambient noise, and the heat load.

5. The method of claim 1, further comprising:
   identifying the current playback session of media on the electronic device, the media comprising a time-varying content; and
   performing the spectral analysis on the at least one remaining portion of the media to identify the at least one future portion of the media having the audio response level that is different from the current audio response level of the current portion of the media;
   wherein the audio response level during the at least one future portion is at least one of an increased audio response level and a decreased audio response level; and
   wherein the at least one adjustment is at least one of: an increase in the level of cooling performance and a decrease to the level of cooling performance.

6. The method of claim 5, further comprising:
   in response to the at least one future portion having an increased audio response level, delaying at least one increase to a level of cooling performance associated with the at least one active cooling device until the current playback session reaches the at least one future portion.

7. The method of claim 5, further comprising:
   in response to the at least one future portion having a decreased audio response level:
      applying, to the at least one active cooling device, at least one first adjustment that temporarily increases a level of cooling performance associated with the at least one active cooling device until the current playback session reaches the at least one future portion and that audibly masks the noise level of the at least one active cooling device relative to the current audio response level; and
      calculating the at least one adjustment based on the current audio response level, the decreased level of audio output, the level of ambient noise, and the heat load, wherein the at least one adjustment decreases a level of cooling performance associated with the at least one active cooling device and audibly masks the noise level of the at least one active cooling device relative to the decreased audio response level during the at least one future portion;
   wherein the at least one adjustment is applied to the at least one active cooling device in response to the current playback session reaching the at least one future portion, and wherein the at least one adjustment is applied for the duration of the at least one future portion.

8. The method of claim 5, further comprising:
   in response to identifying the at least one future portion, calculating at least one sound equalization adjustment for the media based on the current audio response level, the audio response level during the at least one future portion, the level of ambient noise, and the heat load, wherein the at least one sound equalization adjustment modifies an output frequency response of the media to audibly mask the noise level of the at least one active cooling device relative to the audio response level during the at least one future portion; and
   in response to the current playback session reaching the at least one future portion, applying the at least one sound equalization adjustment to the media for the duration of the at least one future portion.

9. An electronic device comprising:
   a memory;
   at least one active cooling device that is coupled to at least one heat generating device;

at least one microphone that measures a level of ambient noise within a surrounding environment;

at least one thermal sensor that measures a heat load generated by the at least one heat generating device; and at least one processor that:

determines a current noise level of at least one active cooling device of an electronic device;

identifies, via spectral analysis on at least one remaining portion of the media after a current portion, at least one future portion of a current playback session of media, the future portion having an audio response level that is a change from a current audio response level of the current portion of the media;

in response to identifying the at least one future portion, calculates at least one adjustment based, at least in part, on the current audio response level, the audio response level during the at least one future portion, the level of ambient noise, and the heat load; and applies, to the at least one active cooling device, at least one adjustment that mitigates the heat load and minimizes audible noise generated by the at least one active cooling device relative to the level of ambient noise and the audio response level;

wherein the at least one adjustment modifies a level of cooling performance associated with the at least one active cooling device to audibly mask the noise level of the at least one active cooling device relative to the audio response level during the at least one future portion.

10. The electronic device of claim 9, wherein in determining the current noise level of the at least one active cooling device, the at least one microphone measures the current noise level of the at least one active cooling device.

11. The electronic device of claim 9, wherein in determining the current noise level of the at least one active cooling device, the at least one processor:

determines a current operating speed of the at least one active cooling device; and estimates the current noise level based on the current operating speed and known operating parameters of the at least one active cooling device.

12. The electronic device of claim 9, further comprising a speaker, wherein:

the at least one processor identifies a current playback session of media on the electronic device, the media comprising a time-varying content;

the at least one microphone measures a current level of audio output of the media at a speaker of the electronic device; and the at least one processor:

compares the current noise level of the at least one active cooling device to the level of audio output by the speaker;

determines whether the current noise level exceeds a noise threshold relative to the current level of audio output by the speaker; and in response to determining the current noise level exceeds the noise threshold, calculates the at least one adjustment based on the current noise level, the current level of audio output, the level of ambient noise, and the heat load.

13. The electronic device of claim 11, wherein the at least one processor:

identifies the current playback session of media on the electronic device, the media comprising a time-varying content; and performs the spectral analysis on at least one remaining portion of the media to identify the at least one future portion of the media having the audio response level that is different from the current audio response level of the current portion of the media;

wherein the audio response level during the at least one future portion is at least one of an increased audio response level and a decreased audio response level; and wherein the at least one adjustment is at least one of: an increase in the level of cooling performance and a decrease to the level of cooling performance.

14. The electronic device of claim 13, wherein the at least one processor:

in response to the at least one future portion having an increased audio response level, delays at least one increase to a level of cooling performance associated with the at least one active cooling device until the current playback session reaches the at least one future portion.

15. The electronic device of claim 13, wherein the at least one processor:

in response to determining the at least one future portion has a decreased audio response level:

applies, to the at least one active cooling device, at least one first adjustment that temporarily increases a level of cooling performance associated with the at least one active cooling device until the current playback session reaches the at least one future portion and that audibly masks the noise level of the at least one active cooling device relative to the current audio response level; and calculates the at least one adjustment based on the current audio response level, the decreased level of audio output, the level of ambient noise, and the heat load, wherein the at least one adjustment decreases a level of cooling performance associated with the at least one active cooling device and audibly masks the noise level of the at least one active cooling device relative to the decreased audio response level during the at least one future portion, wherein the at least one adjustment is applied to the at least one active cooling device in response to the current playback session reaching the at least one future portion, and wherein the at least one adjustment is applied for the duration of the at least one future portion.

16. The electronic device of claim 13, wherein the at least one processor:

in response to identifying the at least one future portion, calculates at least one sound equalization adjustment for the media based on the current audio response level, the audio response level during the at least one future portion, the level of ambient noise, and the heat load, wherein the at least one sound equalization adjustment modifies an output frequency response of the media to audibly mask the noise level of the at least one active cooling device relative to the audio response level during the at least one future portion; and in response to the current playback session reaching the at least one future portion, applies the at least one sound equalization adjustment to the media for the duration of the at least one future portion.

17. A computer program product comprising:

a non-transitory computer readable storage device; and program code on the computer readable storage device that, when executed by a processor associated with an electronic device, enables the electronic device to provide the functionality of:

determining a current noise level of at least one active cooling device of an electronic device;

measuring a level of ambient noise within a surrounding environment by at least one microphone of the electronic device;

identifying at least one future portion of a current playback session of media, the future portion having an audio response level that is a change from a current audio response level of a current portion of the media, the identifying completed via spectral analysis on at least one remaining portion of the media after the current portion;

measuring, via at least one thermal sensor, a heat load generated by at least one heat generating device of the electronic device;

in response to identifying the at least one future portion, calculating at least one adjustment based, at least in part, on the current audio response level, the audio response level during the at least one future portion, the level of ambient noise, and the heat load; and     applying, to the at least one active cooling device, the at least one adjustment that mitigates the heat load and minimizes audible noise generated by the at least one active cooling device relative to the level of ambient noise and the audio response level;

wherein the at least one adjustment modifies a level of cooling performance associated with the at least one active cooling device to audibly mask the noise level of the at least one active cooling device relative to the audio response level during the at least one future portion.

18. The computer program product of claim 17, the program code further comprising code for:

identifying a current playback session of media on the electronic device, the media comprising a time-varying content;

measuring, via the at least one microphone, a current level of audio output of the media at a speaker of the electronic device;

comparing the current noise level of the at least one active cooling device to the level of audio output by the speaker;

determining whether the current noise level exceeds a noise threshold relative to the current level of audio output by the speaker; and     in response to determining the current noise level exceeds the noise threshold, calculating the at least one adjustment based on the current noise level, the current level of audio output, the level of ambient noise, and the heat load.

19. The computer program product of claim 18, the program code further comprising code for:

identifying the current playback session of media on the electronic device, the media comprising a time-varying content; and     performs the spectral analysis on the at least one remaining portion of the media to identify the at least one future portion of the media having the audio response level that is different from the current audio response level of the current portion of the media;

wherein the audio response level during the at least one future portion is at least one of an increased audio response level and a decreased audio response level; and     wherein the at least one adjustment is at least one of: an increase in the level of cooling performance and a decrease to the level of cooling performance.

20. The computer program product of claim 18, the program code further comprising code for:

in response to the at least one future portion having an increased audio response level, delaying at least one increase to a level of cooling performance associated with the at least one active cooling device until the current playback session reaches the at least one future portion; and     in response to determining the at least one future portion has a decreased audio response level:

applying, to the at least one active cooling device, at least one first adjustment that temporarily increases a level of cooling performance associated with the at least one active cooling device until the current playback session reaches the at least one future portion and that audibly masks the noise level of the at least one active cooling device relative to the current audio response level; and         calculating the at least one adjustment based on the current audio response level, the decreased level of audio output, the level of ambient noise, and the heat load, wherein the at least one adjustment decreases a level of cooling performance associated with the at least one active cooling device and audibly masks the noise level of the at least one active cooling device relative to the decreased audio response level during the at least one future portion, wherein the at least one adjustment is applied to the at least one active cooling device in response to the current playback session reaching the at least one future portion, and wherein the at least one adjustment is applied for the duration of the at least one future portion.

\* \* \* \* \*